United States Patent
Dufresne et al.

(10) Patent No.: US 10,146,650 B1
(45) Date of Patent: Dec. 4, 2018

(54) STATUS MONITORING SYSTEM AND METHOD

(71) Applicant: EMC CORPORATION, Hopkinton, MA (US)

(72) Inventors: Daniel Dufresne, Salem, NH (US); Thomas Thibodeau, Whitinsville, MA (US); Ryan McDaniel, Hopkinton, MA (US); Spero Tsefrekas, Shrewsbury, MA (US); Matthew J. Borsini, Northborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/248,404

(22) Filed: Aug. 26, 2016

(51) Int. Cl.
G06F 11/20 (2006.01)
G06F 3/06 (2006.01)

(52) U.S. Cl.
CPC ........ G06F 11/2094 (2013.01); G06F 3/0619 (2013.01); G06F 3/0659 (2013.01); G06F 3/0683 (2013.01); G06F 2201/805 (2013.01); G06F 2201/82 (2013.01)

(58) Field of Classification Search
CPC ............. G06F 11/0709; G06F 11/0727; G06F 11/0751; G06F 11/0754; G06F 11/3447; G06F 11/3466; G06F 11/36; G06F 11/0784; G06F 11/3051; G06F 11/3065; G06F 11/3089
See application file for complete search history.

(56) References Cited

U.S. PATENT DOCUMENTS 4,628,434 A * 12/1986 Tashiro .................. G06Q 10/06 700/47
7,299,294 B1 * 11/2007 Bruck ............... H04L 29/12216 709/201
7,496,694 B2 2/2009 Balasubramanian et al.
9,203,865 B2 * 12/2015 Linden .................. G06F 11/181
2010/0169446 A1 * 7/2010 Linden .................. G06F 11/181 709/206
2015/0180720 A1 * 6/2015 Merchant ................ H04L 41/12 709/204
2016/0062856 A1 * 3/2016 Mu ...................... G06F 11/2071 714/4.12
2017/0310625 A1 * 10/2017 Hu .......................... H04L 51/22

OTHER PUBLICATIONS

Non-Final Office Action issued in U.S. Appl. No. 15/247,321, dated May 17, 2018.

(Continued)

Primary Examiner — Nadeem Iqbal
(74) Attorney, Agent, or Firm — Krishnendu Gupta; Konrad R. Lee

(57) ABSTRACT

A status monitoring system includes a signal generation subsystem configured to provide a status signal indicative of the status of one or more monitored subcomponents. A processing subsystem is associated with a controlled subcomponent and is configured to: assign a subcomponent policy to the controlled subcomponent, receive the status signal, compare the status signal to the subcomponent policy, and effectuate a procedure on the controlled subcomponent based, at least in part, upon the comparison of the status signal and the subcomponent policy.

20 Claims, 6 Drawing Sheets

(56) References Cited

OTHER PUBLICATIONS

Chu, S. Y., et al. "Integration issues in implementation of structural control systems." Structural Control and Health 9.1 (2002): pp. 31-58 (2002).
Non-Final Office Action issued in U.S. Appl. No. 15/363,693 dated Aug. 9, 2018.
Non-Final Office Action issued in U.S. Appl. No. 15/363,792 dated Aug. 9, 2018.

* cited by examiner

STATUS MONITORING SYSTEM AND METHOD

TECHNICAL FIELD

This disclosure relates to status monitoring procedures and, more particularly, to status monitoring procedures and status-based policy implementation.

BACKGROUND

Storing and safeguarding electronic content is of paramount importance in modern business. Accordingly, various systems and methodologies may be employed to protect such electronic content.

The use of redundant high-availability storage systems is increasing in popularity. Unfortunately, even redundant systems may fail during the course of normal operation. And when such redundant systems fail, the above-described electronic content could be lost. Accordingly, if it is known that a subcomponent within a redundant high-availability storage systems is failing (or will be failing), procedures may be employed that may mitigate the impact of such failure.

SUMMARY OF DISCLOSURE

In one implementation, a status monitoring system includes a signal generation subsystem configured to provide a status signal indicative of the status of one or more monitored subcomponents. A processing subsystem is associated with a controlled subcomponent and is configured to: assign a subcomponent policy to the controlled subcomponent, receive the status signal, compare the status signal to the subcomponent policy, and effectuate a procedure on the controlled subcomponent based, at least in part, upon the comparison of the status signal and the subcomponent policy.

One or more of the following features may be included. Two or more additional processing subsystems may be associated with two or more additional controlled subcomponents. A communication bus may be configured to electrically couple the signal generation subsystem to the processing subsystem. The status signal may include an upcoming failure indicator. The status signal may include an overload indicator. The controlled subcomponent may include a controlled subcomponent within a data storage system. A computer program product may reside on a computer readable medium having a plurality of instructions stored thereon which, when executed by a processor, may cause the processor to perform operations including defining a logical subcomponent group that includes a plurality of controlled subcomponents, associating the subcomponent policy with logical subcomponent group, and providing one or more control signals that enable the assigning of the subcomponent policy to the controlled subcomponent. The processing subsystem may be configured to receive the one or more control signals. The processing subsystem may include an analog-to-digital decoder circuit. The analog-to-digital decoder circuit may include a comparator circuit configured to control the controlled subcomponent. The analog-to-digital decoder circuit may include one or more voltage divider circuits configured to assign the subcomponent policy to the controlled subcomponent. The one or more voltage divider circuits may be configured to receive the one or more control signals.

In another implementation, a status monitoring system includes a signal generation subsystem configured to provide a status signal indicative of the status of one or more monitored subcomponents. A processing subsystem is associated with a controlled subcomponent and is configured to: assign a subcomponent policy to the controlled subcomponent, receive the status signal, compare the status signal to the subcomponent policy, and effectuate a procedure on the controlled subcomponent based, at least in part, upon the comparison of the status signal and the subcomponent policy. A communication bus is configured to electrically couple the signal generation subsystem to the processing subsystem. A computer program product resides on a computer readable medium having a plurality of instructions stored thereon which, when executed by a processor, cause the processor to perform operations including defining a logical subcomponent group that includes a plurality of controlled subcomponents, associating the subcomponent policy with logical subcomponent group; and providing one or more control signals that enable the assigning of the subcomponent policy to the controlled subcomponent.

One or more of the following features may be included. The processing subsystem may be configured to receive the one or more control signals. The processing subsystem may include an analog-to-digital decoder circuit. The analog-to-digital decoder circuit may include a comparator circuit configured to control the controlled subcomponent. The analog-to-digital decoder circuit may include one or more voltage divider circuits configured to assign the subcomponent policy to the controlled subcomponent. The one or more voltage divider circuits may be configured to receive the one or more control signals.

In another implementation, a status monitoring system includes a signal generation subsystem configured to provide a status signal indicative of the status of one or more monitored subcomponents. A processing subsystem is associated with a controlled subcomponent and is configured to: assign a subcomponent policy to the controlled subcomponent within a data storage system, receive the status signal, compare the status signal to the subcomponent policy, and effectuate a procedure on the controlled subcomponent based, at least in part, upon the comparison of the status signal and the subcomponent policy. A communication bus is configured to electrically couple the signal generation subsystem to the processing subsystem. A computer program product resides on a computer readable medium having a plurality of instructions stored thereon which, when executed by a processor, cause the processor to perform operations including: defining a logical subcomponent group that includes a plurality of controlled subcomponents, associating the subcomponent policy with logical subcomponent group; and providing one or more control signals that enable the assigning of the subcomponent policy to the controlled subcomponent. The processing subsystem is configured to receive the one or more control signals.

One or more of the following features may be included. Two or more additional processing subsystems may be associated with two or more additional controlled subcomponents.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
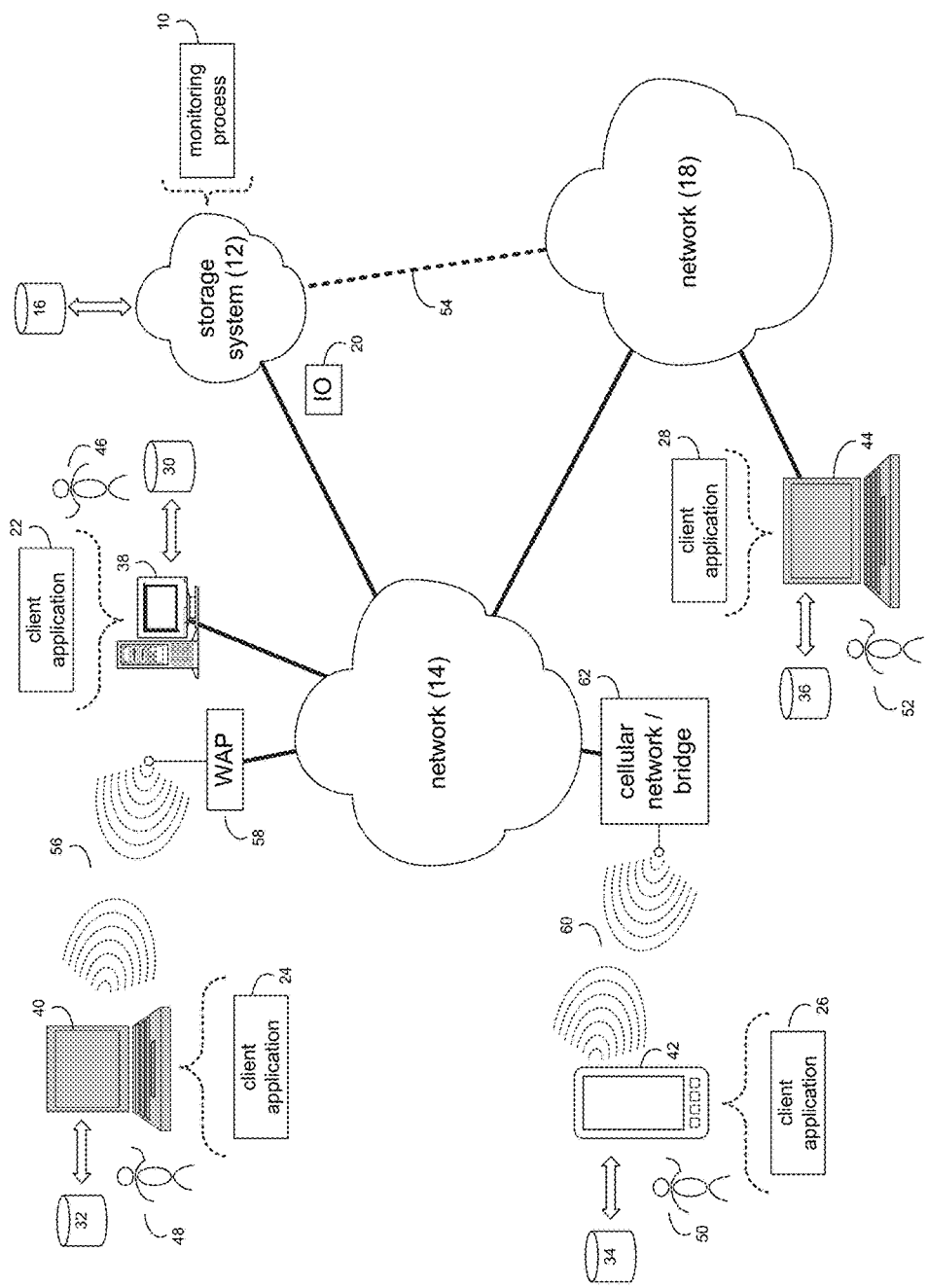
FIG. 1 is a diagrammatic view of a storage system and a monitoring process coupled to a distributed computing network.

System Overview:

Referring to FIG. 1, there is shown monitoring process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of monitoring process 10, which may be stored on storage device 16 included within storage system 12, may be executed by one or more processors (not shown) and one or more memory architectures (not shown) included within storage system 12. Examples of storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices (e.g., client electronic devices 38, 40, 42, 44) may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux®, or a custom operating system.

For illustrative purposes, storage system 12 will be described as being a network-based storage system that includes a plurality of backend storage devices. However, this is for illustrative purposes only and is not intended to be a limitation of this disclosure, as other configurations are possible and are considered to be within the scope of this disclosure.

Figure 2:
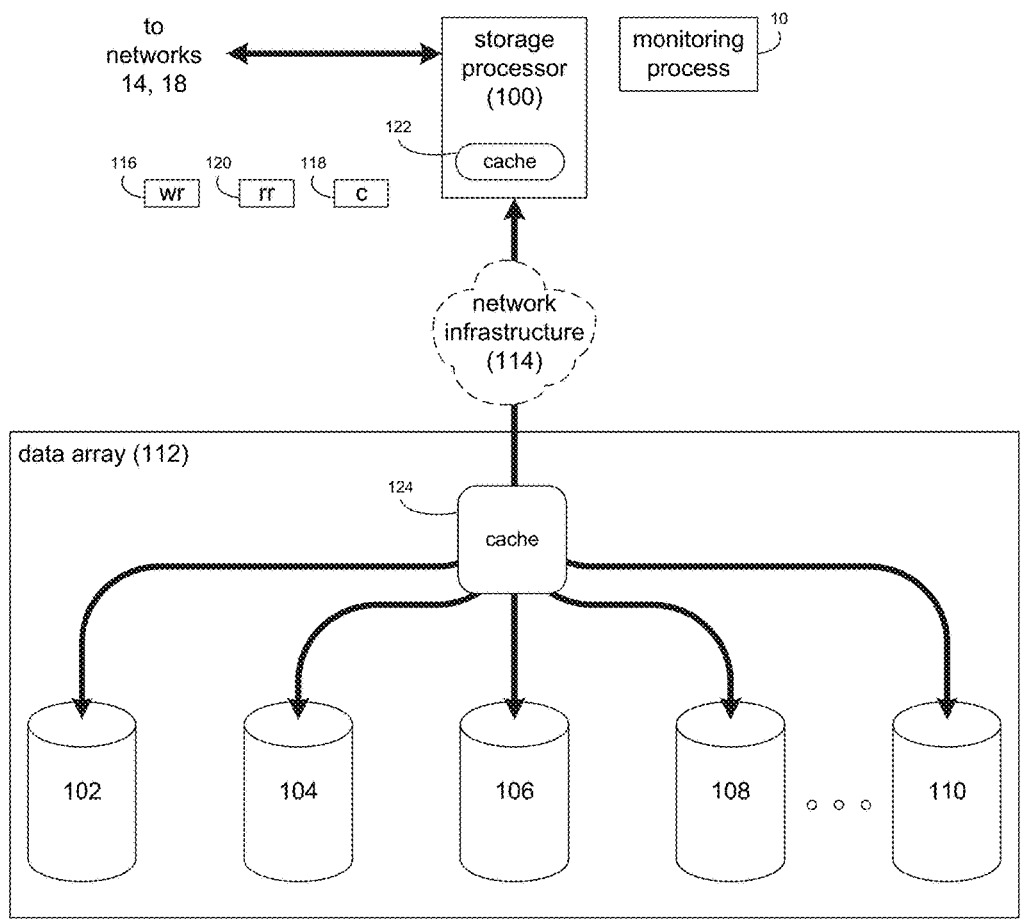
FIG. 2 is a diagrammatic view of the storage system of FIG. 1.

Data Storage System:

Referring also to FIG. 2, there is shown a general implementation of storage system 12. In this general implementation, data storage system 12 may include storage processor 100 and a plurality of storage targets (e.g. storage targets 102, 104, 106, 108, 110). Storage targets 102, 104, 106, 108, 110 may be configured to provide various levels of performance and/or high availability. For example, one or more of storage targets 102, 104, 106, 108, 110 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108, 110 may be configured as a RAID 1 array, in which data is mirrored between storage targets. By mirroring data between storage targets, a level of high availability is achieved as multiple copies of the data are stored within storage system 12.

While storage targets 102, 104, 106, 108, 110 are discussed above as being configured in a RAID 0 or RAID 1 array, this is for illustrative purposes only and is not intended to be a limitation of this disclosure, as other configurations are possible. For example, storage targets 102, 104, 106, 108, 110 may be configured as a RAID 3, RAID 4, RAID 5, RAID 6 or RAID 7 array.

While in this particular example, storage system 12 is shown to include five storage targets (e.g. storage targets 102, 104, 106, 108, 110), this is for illustrative purposes only and is not intended to be a limitation of this disclosure. Specifically, the actual number of storage targets may be increased or decreased depending upon e.g. the level of redundancy/performance/capacity required.

One or more of storage targets 102, 104, 106, 108, 110 may be configured to store coded data, wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage device.

Examples of storage targets 102, 104, 106, 108, 110 may include one or more electro-mechanical hard disk drives and/or solid-state/flash devices, wherein a combination of storage targets 102, 104, 106, 108, 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108, 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108, 110 may be a RAID device and/or computer-based hard disk drives. Further still, one or more of storage targets 102, 104, 106, 108, 110 may be a SAN.

In the event that storage system 12 is configured as a SAN, the various components of storage system 12 (e.g. storage processor 100, storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of monitoring process 10. The instruction sets and subroutines of monitoring process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, 110.

As discussed above, the instruction sets and subroutines of monitoring process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of monitoring process 10 may be executed by one or more processors (not shown) and one or more memory architectures (not shown) included within data array 112.

Figure 3:
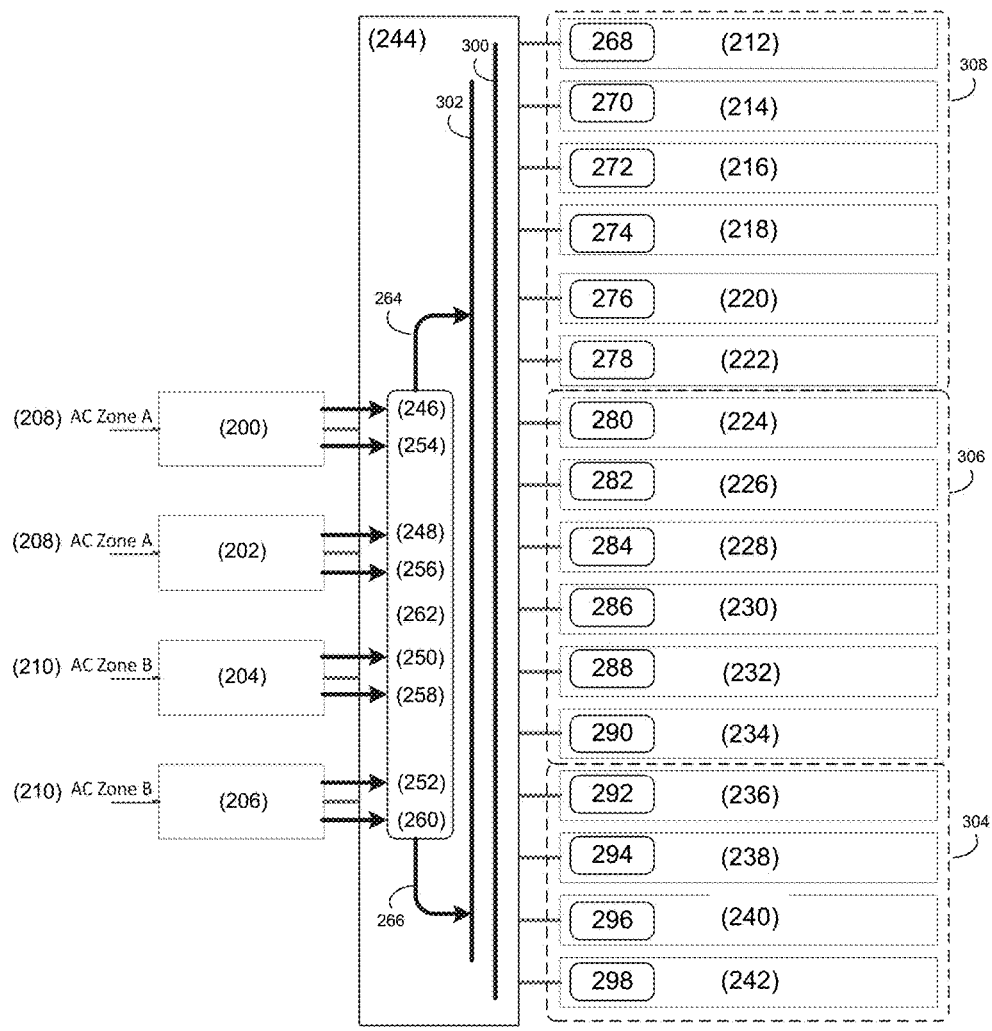
FIG. 3 is a diagrammatic view of a storage processor included within the storage system of FIG. 2.

Referring to FIG. 3, there is shown one implementation of storage processor 100. In this implementation, storage process 100 may be configured in a highly available fashion. For example, storage process 100 may include a plurality of power supply units (e.g., PSU 200, 202, 204, 206) that are powered by two different AC power sources (e.g., power sources 208, 210). These four power supply units (e.g., PSU 200, 202, 204, 206) may power a plurality of subcomponents of storage processor 100. Examples of these subcomponents of storage processor 100 may include but are not limited to blade assemblies 212, 214, 216, 218, 220, 222, 224, 226, 228, 230, 232, 234, 236, 238, 240, 242. The power supply units (e.g., PSU 200, 202, 204, 206) and the subcomponents of storage processor 100 (e.g., blade assemblies 212, 214, 216, 218, 220, 222, 224, 226, 228, 230, 232, 234, 236, 238, 240, 242) may be electrically coupled to each other via e.g., backplane assembly 244. As is known in the art, one example of a blade assembly is a self-contained server assembly, which may be configured to be hot-swappable and releasably positionable within storage processor 100.

The power supply units (e.g., PSU 200, 202, 204, 206) may be configured to provide a warning that their individual outputs are about to drop below an acceptable level through one or more discrete signals, examples of which may include but are not limited to: an upcoming failure indicator such as Early Power Off Warning signals (e.g., EPOW status signals 246, 248, 250, 252); and an overload indicator such as Throttle Reduction signals (e.g., TR status signals 254, 256, 258, 260).

For the following discussion, signal generation subsystem 262 is going to be discussed as being included within backplane 244. This is for illustrative purposes only and is not intended to be a limitation of this disclosure, as other configurations are possible and are considered to be within the scope of this disclosure. For example, signal generation subsystem 262 may be included within other portions of e.g., storage processor 100, examples of which may include but are not limited to a midplane assembly (not shown) and/or a daughter/expansion card (not shown).

Further, while storage processor 100 is shown to include a single signal generation subsystem 262, this is for illustrative purposes only and is not intended to be a limitation of this disclosure, as other configurations are possible and are considered to be within the scope of this disclosure. For example, additional signal generation subsystems may be included within e.g., storage processor 100 to allow for a level of redundancy/high-availability in the event of a failure of signal generation subsystem 262.

Early Power Off Warning signals (e.g., EPOW status signals 246, 248, 250, 252) and Throttle Reduction signals (e.g., TR status signals 254, 256, 258, 260) may be provided to signal generation subsystem 262 and may be configured so that the hardware that the power supply units (e.g., PSU 200, 202, 204, 206) are powering (e.g., blade assemblies 212, 214, 216, 218, 220, 222, 224, 226, 228, 230, 232, 234, 236, 238, 240, 242) has time to react prior to the output of the power supply units (e.g., PSU 200, 202, 204, 206) dropping below an acceptable level. For example and in response to such a warning signal, one or more of the subcomponents of storage processor 100 (e.g., blade assemblies 212, 214, 216, 218, 220, 222, 224, 226, 228, 230, 232, 234, 236, 238, 240, 242) may be powered down and/or throttled to a lower performance level prior to the output drop of the power supply units (e.g., PSU 200, 202, 204, 206), thus preventing the loss of data due to storage processor 100 crashing and/or being damaged due to a low voltage condition.

The length of the warning provided by the Early Power Off Warning signals (e.g., EPOW status signals 246, 248, 250, 252) and Throttle Reduction signals (e.g., TR status signals 254, 256, 258, 260) may vary depending upon the capabilities of the power supply units (e.g., PSU 200, 202, 204, 206). Examples of such warning length may include two milliseconds for the Early Power Off Warning signals (e.g., EPOW status signals 246, 248, 250, 252) and one hundred microseconds for the Throttle Reduction signals (e.g., TR status signals 254, 256, 258, 260).

In a large of storage processor 100 wherein a large quantity of subcomponents (e.g., blade assemblies 212, 214, 216, 218, 220, 222, 224, 226, 228, 230, 232, 234, 236, 238, 240, 242) are included, it may be desirable to have the ability to select which subcomponents get powered down and/or throttled back when one or more of the power supply units (e.g., PSU 200, 202, 204, 206) provides an Early Power Off Warning signals (e.g., EPOW status signals 246, 248, 250, 252) and/or a Throttle Reduction signals (e.g., TR status signals 254, 256, 258, 260).

As will be discussed below in greater detail, signal generation subsystem 262 may be configured to process the Early Power Off Warning signals (e.g., EPOW status signals 246, 248, 250, 252) and generate master EPOW status signal 264. Further, signal generation subsystem 262 may be configured to process the Throttle Reduction signals (e.g., TR status signals 254, 256, 258, 260) and generate master TR status signal 266. Once generated and as will be discussed below in great detail, master EPOW status signal 264 and master TR status signal 266 may be provided to one or more processing subsystem (e.g., processing subsystems 268, 270, 272, 274, 276, 278, 280, 282, 284, 286, 288, 290, 292, 294, 296, 298).

A unique processing subsystem may be incorporated into/associated with each of the subcomponents of storage processor 100. For example, processing subsystems 268, 270, 272, 274, 276, 278, 280, 282, 284, 286, 288, 290, 292, 294, 296, 298 may be incorporated into/associated with blade assemblies 212, 214, 216, 218, 220, 222, 224, 226, 228, 230, 232, 234, 236, 238, 240, 242, respectively.

For the following example, assume that each of the four power supply units (e.g., PSU 200, 202, 204, 206) may be configured to provide 400 Watts of power to a single 12 VDC bus (e.g., bus 300) included within backplane assembly 244 (for a total of 1,600 Watts of power available). Further, assume that each of the subcomponents (e.g., blade assemblies 212, 214, 216, 218, 220, 222, 224, 226, 228, 230, 232, 234, 236, 238, 240, 242) of storage processor 100 consumes up to 100 Watts of power (for a total of 1,600 Watts consumed). Additionally, assume that storage processor 100 is configurable to include three different levels of power supply unit (PSU) redundancy: namely 4+0 (i.e., no PSU redundancy); 3+1 (i.e., single PSU redundancy), and 2+2 (i.e., double PSU redundancy).

Figure 4:
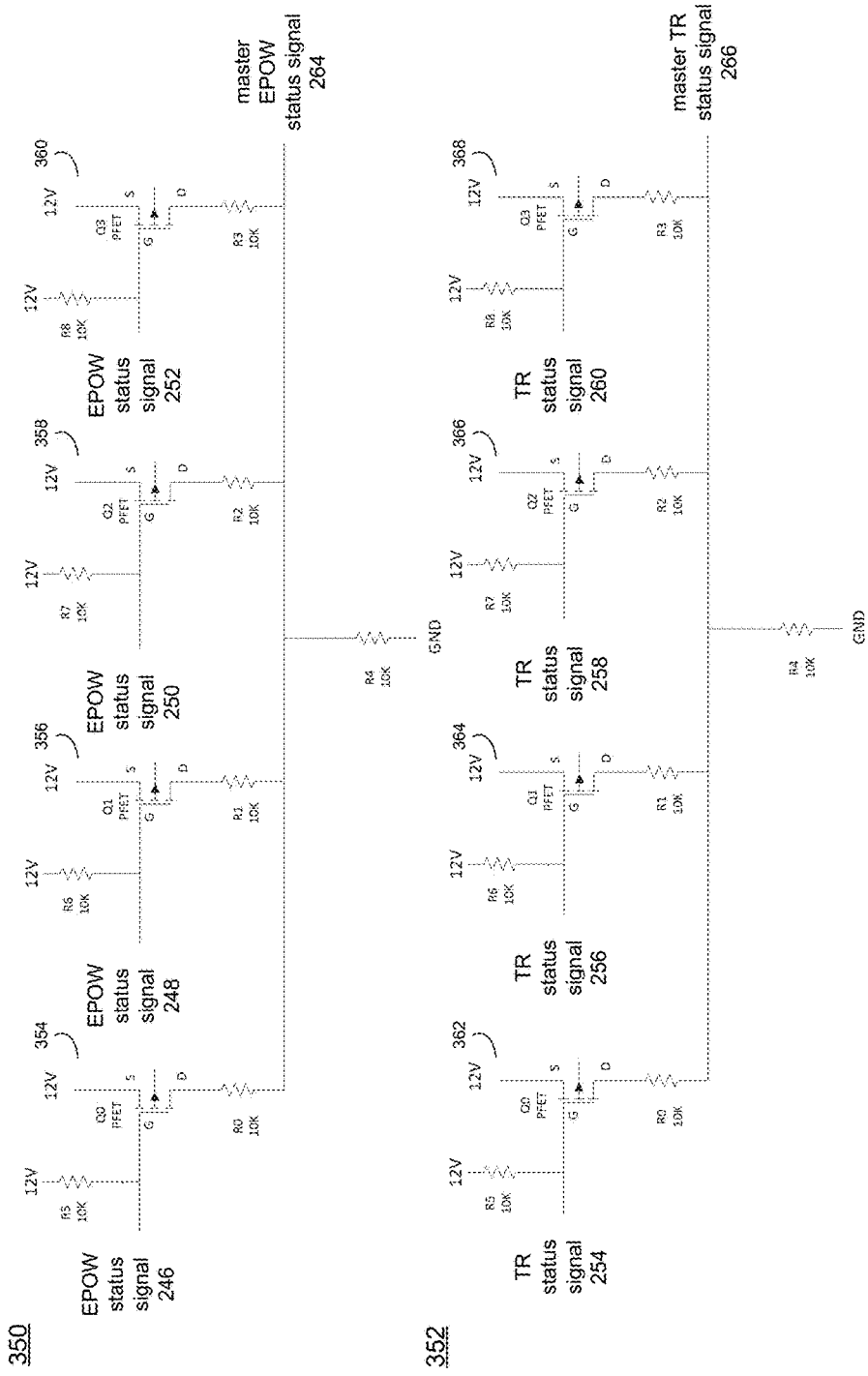
FIG. 4 is a schematic view of a signal generation subsystem of the storage processor of FIG. 3.

Signal Generation Subsystem:

Referring also to FIG. 4, there is shown one implementation of signal generation subsystem 262. As discussed above, signal generation subsystem 262 may be configured to provide a status signal (e.g., master EPOW status signal 264 and/or master TR status signal 266) indicative of the status of one or more monitored subcomponents (e.g., PSU 200, 202, 204, 206).

Specifically, signal generation subsystem 262 may be configured to process the Early Power Off Warning signals (e.g., EPOW status signals 246, 248, 250, 252) to generate master EPOW status signal 264. Further, signal generation subsystem 262 may be configured to process the Throttle Reduction signals (e.g., TR status signals 254, 256, 258, 260) to generate master TR status signal 266.

Accordingly, first portion 350 of signal generation subsystem 262 may be configured to receive a plurality of binary status signals (e.g., EPOW status signals 246, 248, 250, 252) from a plurality of monitored subcomponents (e.g., PSU 200, 202, 204, 206) and encode the plurality of binary status signals (e.g., EPOW status signals 246, 248, 250, 252) to generate a status signal (e.g., master EPOW status signal 264) indicative of the status of the plurality of monitored subcomponents (e.g., PSU 200, 202, 204, 206).

Further, second portion 352 of signal generation subsystem 262 may be configured to receive a plurality of binary status signals (e.g., TR status signals 254, 256, 258, 260) from a plurality of monitored subcomponents (e.g., PSU 200, 202, 204, 206) and encode the plurality of binary status signals (e.g., TR status signals 254, 256, 258, 260) to generate a status signal (e.g., master TR status signal 266) indicative of the status of the plurality of monitored subcomponents (e.g., PSU 200, 202, 204, 206).

Signal generation subsystem 262 may include one or more digital-to-analog encoder circuits. For example, first portion 350 of signal generation subsystem 262 may be a first digital-to-analog encoder circuit, wherein this digital-to-analog encoder circuit (e.g., first portion 350 of signal generation subsystem 262) may include a plurality of voltage divider circuits (e.g., voltage divider circuits 354, 356, 358, 360) configured to encode the plurality of binary status signals (e.g., EPOW status signals 246, 248, 250, 252, respectively) and generate the status signal (e.g., master EPOW status signal 264). Specifically, each of the plurality of voltage divider circuits (e.g., voltage divider circuits 354, 356, 358, 360) may be controlled by one of the plurality of binary status signals (e.g., EPOW status signals 246, 248, 250, 252, respectively). For example, voltage divider circuit 354 may be controlled by EPOW status signals 246, voltage divider circuit 356 may be controlled by EPOW status signals 248, voltage divider circuit 358 may be controlled by EPOW status signals 250, and voltage divider circuit 360 may be controlled by EPOW status signals 252.

During operation of first portion 350 of signal generation subsystem 262, EPOW status signals 246, 248, 250, 252 may be combined to form master EPOW status signal 264, which is a quantized analog signal that varies in amplitude depending upon the value of EPOW status signals 246, 248, 250, 252 applied to voltage divider circuits 354, 356, 358, 360. For example and in the configuration shown in FIG. 4, the following values of master EPOW status signal 264 may be realized:

| # of PSUs asserting Early Power Off Warning signals | Value of master EPOW status signal 264 |
|---|---|
| 0 | 0 V |
| 1 | 6 V |
| 2 | 8 V |
| 3 | 9 V |

Master EPOW status signal 264 may be distributed to all of the subcomponents (e.g., blade assemblies 212, 214, 216, 218, 220, 222, 224, 226, 228, 230, 232, 234, 236, 238, 240, 242) of storage processor 100 via communication bus 302 (FIG. 3) included within backplane assembly 244. Communication bus 302 may be configured to electrically couple signal generation subsystem 262 to the one or more processing subsystems (e.g., processing subsystems 268, 270, 272, 274, 276, 278, 280, 282, 284, 286, 288, 290, 292, 294, 296, 298) included within storage processor 100.

Further, second portion 352 of signal generation subsystem 262 may be a second digital-to-analog encoder circuit, wherein this digital-to-analog encoder circuit (e.g., second portion 352 of signal generation subsystem 262) may include a plurality of voltage divider circuits (e.g., voltage divider circuits 362, 364, 366, 368) configured to encode the plurality of binary status signals (e.g., TR status signals 354, 356, 358, 360, respectively) and generate the status signal (e.g., master TR status signal 266). Specifically, each of the plurality of voltage divider circuits (e.g., voltage divider circuits 362, 364, 366, 368) may be controlled by one of the plurality of binary status signals (e.g., TR status signals 354, 356, 358, 360, respectively). For example, voltage divider circuit 362 may be controlled by TR status signals 254, voltage divider circuit 364 may be controlled by TR status signals 256, voltage divider circuit 366 may be controlled by TR status signals 258, and voltage divider circuit 368 may be controlled by TR status signals 260.

During operation of second portion 352 of signal generation subsystem 262, TR status signals 254, 256, 258, 260 may be combined to form master TR status signal 266, which is a quantized analog signal that varies in amplitude depending upon the value of TR status signals 254, 256, 258, 260 applied to voltage divider circuits 362, 364, 366, 368. For example and in the configuration shown in FIG. 4, the following values of master TR status signal 266 may be realized:

| # of PSUs asserting Throttle Reduction signals | Value of master TR status signal 266 |
|---|---|
| 0 | 0 V |
| 1 | 6 V |
| 2 | 8 V |
| 3 | 9 V |

Master TR status signal 266 may be distributed to all of the subcomponents (e.g., blade assemblies 212, 214, 216, 218, 220, 222, 224, 226, 228, 230, 232, 234, 236, 238, 240, 242) of storage processor 100 via communication bus 302 (FIG. 3) included within backplane assembly 244.

As discussed above, each of the subcomponents (e.g., blade assemblies 212, 214, 216, 218, 220, 222, 224, 226, 228, 230, 232, 234, 236, 238, 240, 242) included within storage processor 100 may include a processing subsystem (e.g., processing subsystems 268, 270, 272, 274, 276, 278, 280, 282, 284, 286, 288, 290, 292, 294, 296, 298, respectively). Each of the processing subsystems (e.g., processing subsystems 268, 270, 272, 274, 276, 278, 280, 282, 284, 286, 288, 290, 292, 294, 296, 298) may be configured to receive master EPOW status signal 264 and/or master TR status signal 266 and control a controlled subcomponent (e.g., blade assemblies 212, 214, 216, 218, 220, 222, 224, 226, 228, 230, 232, 234, 236, 238, 240, 242, respectively) based, at least in part, upon master EPOW status signal 264 and/or master TR status signal 266.

While the following discussion concerns processing subsystem 268 included within blade assembly 212, this is for illustrative purposes only and is not intended to be a limitation of this disclosure. Accordingly, the following discussion may concern any of the processing subsystems (e.g., processing subsystems 268, 270, 272, 274, 276, 278, 280, 282, 284, 286, 288, 290, 292, 294, 296, 298) included within any of the subcomponents (e.g., blade assemblies 212, 214, 216, 218, 220, 222, 224, 226, 228, 230, 232, 234, 236, 238, 240, 242) of storage processor 100.

Figure 5:
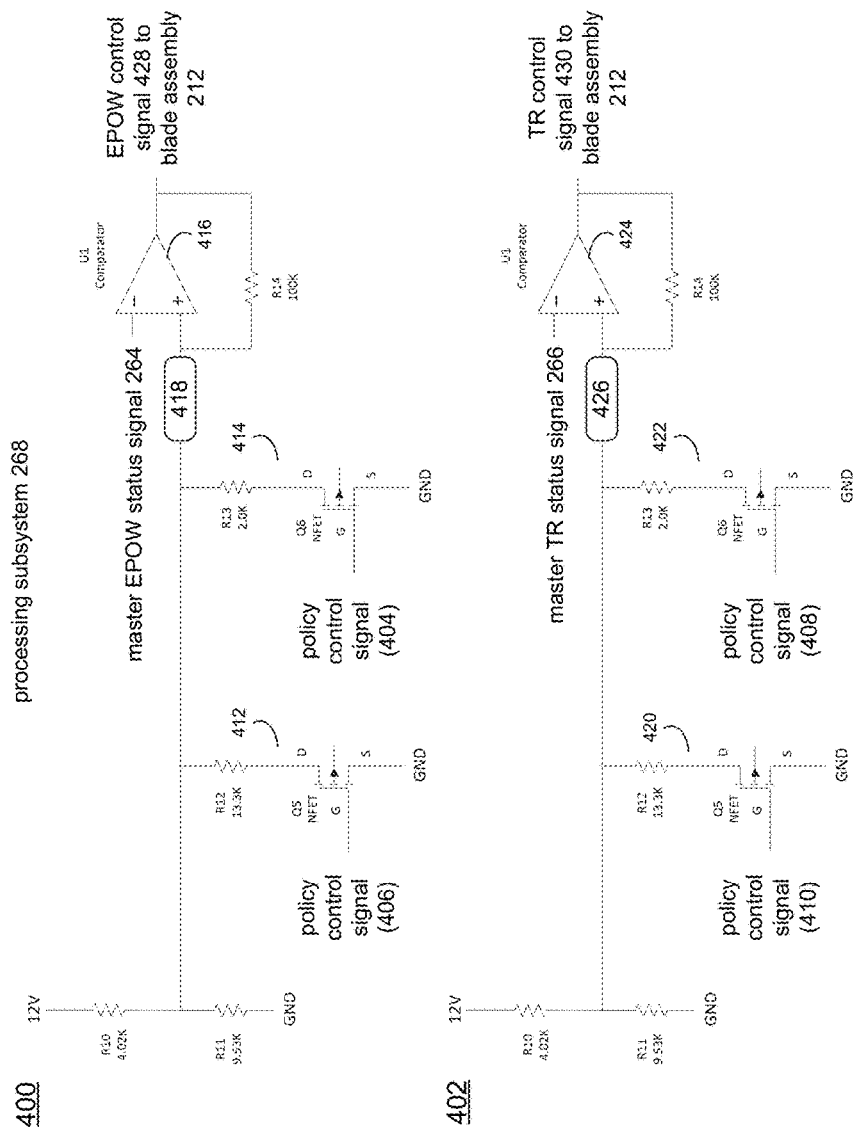
FIG. 5 is a schematic view of a processing subsystem of the storage processor of FIG. 3.

Processing Subsystem:

Referring also to FIG. 5, there is shown one implementation of processing subsystem 268. As will be discussed below in greater detail, processing subsystem 268 may be configured to assign a subcomponent policy (e.g., 4+0, 3+1 or 2+2) to blade assembly 212 and process both master EPOW status signal 264 and/or master TR status signal 266.

Accordingly, first portion 400 of processing subsystem 268 may be configured to assign a subcomponent policy (e.g., 4+0, 3+1 or 2+2) to the controlled subcomponent (e.g., blade assembly 212) and may concern how blade assembly 212 should react to master EPOW status signal 264. The assignment of a subcomponent policy (e.g., 4+0, 3+1 or 2+2) to blade assembly 212 may be accomplished by providing one or more control signals (e.g., control signals 404, 406) to processing subsystem 268. Upon receiving master EPOW status signal 264, first portion 400 of processing subsystem 268 may compare the status signal (e.g., master EPOW status signal 264) to the subcomponent policy (e.g., 4+0, 3+1 or 2+2) and effectuate a procedure on the controlled subcomponent (e.g., blade assembly 212) based, at least in part, upon the comparison of master EPOW status signal 264 and the subcomponent policy (e.g., 4+0, 3+1 or 2+2). Examples of such procedures effectuated on blade assembly 212 may include but are not limited to the powering down of blade assembly 212.

Further, second portion 402 of processing subsystem 268 may be configured to assign a subcomponent policy (e.g., 4+0, 3+1 or 2+2) to the controlled subcomponent (e.g., blade assembly 212) and may concern how blade assembly 212 should react to master TR status signal 266. The assignment of a subcomponent policy (e.g., 4+0, 3+1 or 2+2) to blade assembly 212 may be accomplished by providing one or more control signals (e.g., control signals 408, 410) to processing subsystem 268. Upon receiving master TR status signal 266, second portion 402 of processing subsystem 268 may compare the status signal (e.g., master TR status signal 266) to the subcomponent policy (e.g., 4+0, 3+1 or 2+2) and effectuate a procedure on the controlled subcomponent (e.g., blade assembly 212) based, at least in part, upon the comparison of master TR status signal 266 and the subcomponent policy (e.g., 4+0, 3+1 or 2+2). Examples of such procedures effectuated on blade assembly 212 may include but are not limited to throttling of blade assembly 212 to a lower performance level (e.g., clock rate).

Processing subsystem 268 may include one or more analog-to-digital decoder circuits. For example, first portion 400 of processing subsystem 268 may be a first analog-to-digital decoder circuit, wherein this analog-to-digital decoder circuit (e.g., first portion 400 of processing subsystem 268) may include a plurality of voltage divider circuits (e.g., voltage divider circuits 412, 414) configured to receive control signals 404, 406. As discussed above, control signals 404, 406 may assign a subcomponent policy (e.g., 4+0, 3+1 or 2+2) to the controlled subcomponent (e.g., blade assembly 212) and may concern how blade assembly 212 reacts to master EPOW status signal 264.

During operation of first portion 400 of processing subsystem 268, master EPOW status signal 264 may be provided to a first terminal of a comparator (e.g., comparator 416), wherein master EPOW status signal 264 may be compared to a policy signal (e.g., policy signal 418) on a second terminal of comparator 416. As discussed above, the assignment of a subcomponent policy (e.g., 4+0, 3+1 or 2+2) to blade assembly 212 may be accomplished via control signals 404, 406. For example and in the configuration shown in FIG. 5, the following values of policy signal 418 may be defined:

| Policy Control Signal 404 | Policy Control Signal 406 | Value of Policy Signal 418 | Subcomponent Policy for EPOW |
|---|---|---|---|
| 0 | 0 | 8.43 VDC | 2 + 2 |
| 0 | 1 | 6.95 VDC | 3 + 1 |
| 1 | 1 | 3.21 VDC | 4 + 0 |

Accordingly and through the use of control signals 404, 406, the amplitude of control signal 418 may be set. And by varying the amplitude of control signal 418, the manner in which comparator 416 reacts to master EPOW status signal 264 may be adjusted.

A) If first portion 400 of processing subsystem 268 is assigned a subcomponent policy of 4+0 (i.e., control signal 404 is a binary one and control signal 406 is a binary one), as soon as master EPOW status signal 264 exceed 3.21 VDC (which requires only one PSU failure), first portion 400 of processing subsystem 268 may effectuate a procedure on blade assembly 212.

B) If first portion 400 of processing subsystem 268 is assigned a subcomponent policy of 3+1 (i.e., control signal 404 is a binary zero and control signal 406 is a binary one), as soon as master EPOW status signal 264 exceed 6.95 VDC (which requires two PSU failures), first portion 400 of processing subsystem 268 may effectuate a procedure on blade assembly 212.

C) If first portion 400 of processing subsystem 268 is assigned a subcomponent policy of 2+2 (i.e., control signal 404 is a binary zero and control signal 406 is a binary zero), as soon as master EPOW status signal 264 exceed 8.43 VDC (which requires three PSU failures), first portion 400 of processing subsystem 268 may effectuate a procedure on blade assembly 212.

As discussed above and with respect to master EPOW status signal 264, examples of such a procedure effected may include but is not limited to the powering down of blade assembly 212.

Further, second portion 402 of processing subsystem 268 may be a second analog-to-digital decoder circuit, wherein this analog-to-digital decoder circuit (e.g., second portion 402 of processing subsystem 268) may include a plurality of voltage divider circuits (e.g., voltage divider circuits 420, 422) configured to receive control signals 408, 410. As discussed above, control signals 408, 410 may assign a subcomponent policy (e.g., 4+0, 3+1 or 2+2) to the controlled subcomponent (e.g., blade assembly 212) and may concern how blade assembly 212 reacts to master TR status signal 266.

During operation of second portion 402 of processing subsystem 268, master TR status signal 266 may be provided to a first terminal of a comparator (e.g., comparator 424), wherein TR status signal 266 may be compared to a policy signal (e.g., policy signal 426) on a second terminal of comparator 424. As discussed above, the assignment of a subcomponent policy (e.g., 4+0, 3+1 or 2+2) to blade assembly 212 may be accomplished via control signals 408, 410. For example and in the configuration shown in FIG. 5, the following values of policy signal 426 may be defined:

| Policy Control Signal 408 | Policy Control Signal 410 | Value of Policy Signal 426 | Subcomponent Policy for TR |
|---|---|---|---|
| 0 | 0 | 8.43 VDC | 2 + 2 |
| 0 | 1 | 6.95 VDC | 3 + 1 |
| 1 | 1 | 3.21 VDC | 4 + 0 |

Accordingly and through the use of control signals 408, 410, the amplitude of control signal 426 may be set. And by varying the amplitude of control signal 426, the manner in which comparator 424 reacts to master TR status signal 266 may be adjusted.

A) If second portion 402 of processing subsystem 268 is assigned a subcomponent policy of 4+0 (i.e., control signal 408 is a binary one and control signal 410 is a binary one), as soon as master TR status signal 266 exceed 3.21 VDC (which requires only one PSU failure), second portion 402 of processing subsystem 268 may effectuate a procedure on blade assembly 212.

B) If second portion 402 of processing subsystem 268 is assigned a subcomponent policy of 3+1 (i.e., control signal 408 is a binary zero and control signal 410 is a binary one), as soon as master TR status signal 266 exceed 6.95 VDC (which requires two PSU failures), second portion 402 of processing subsystem 268 may effectuate a procedure on blade assembly 212.

C) If second portion 404 of processing subsystem 268 is assigned a subcomponent policy of 2+2 (i.e., control signal 408 is a binary zero and control signal 410 is a binary zero), as soon as master TR status signal 266 exceed 8.43 VDC (which requires three PSU failures), second portion 402 of processing subsystem 268 may effectuate a procedure on blade assembly 212.

As discussed above and with respect to master TR status signal 266, examples of such a procedure effected may include but is not limited to throttling of blade assembly 212 to a lower performance level (e.g., clock rate).

Accordingly and based upon control signals 404, 406, processing subsystem 268 may provide EPOW control signal 428 to blade assembly 212 to initiate the powering down of blade assembly 212 after failure of the required number of PSUs (e.g., one, two or three). Further and based upon control signals 408, 410, processing subsystem 268 may provide TR control signal 430 to blade assembly 212 to initiate the throttling of blade assembly 212 to a lower performance level (e.g., clock rate) after failure of the required number of PSUs (e.g., one, two or three).

While generation subsystem 262 and the one or more processing subsystem (e.g., processing subsystems 268, 270, 272, 274, 276, 278, 280, 282, 284, 286, 288, 290, 292, 294, 296, 298) are described above as being incorporated into storage processor 100 of storage system 10, this is for illustrative purposes only and is not intended to be a limitation of this disclosure, as other configurations are possible and are considered to be within the scope of this disclosure. For example, generation subsystem 262 and the one or more processing subsystem (e.g., processing subsystems 268, 270, 272, 274, 276, 278, 280, 282, 284, 286, 288, 290, 292, 294, 296, 298) may be included within any type of system that includes both monitored subcomponents and controlled subcomponents.

Figure 6:
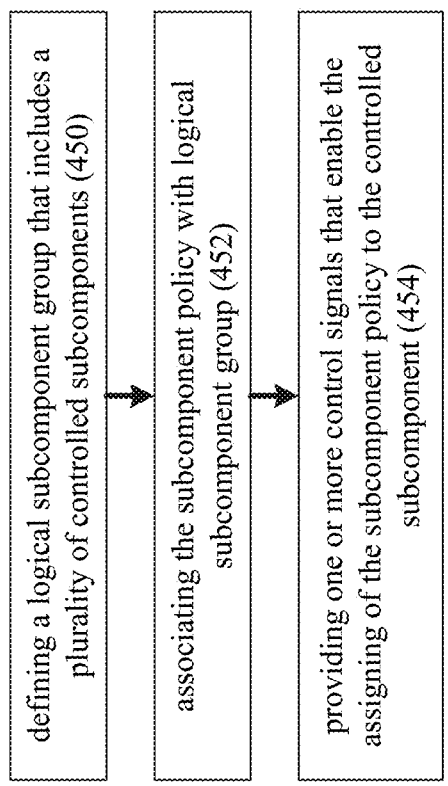
FIG. 6 is a flow chart of the monitoring process of FIG. 1.

The Automated Analysis Process:

As discussed above and referring also to FIG. 6, monitoring process 10 may reside on and may be executed by storage system 12; and may be configured to define the above-described control signals (e.g., control signals 404, 406, 408, 410) and set the appropriate subcomponent policies for (in this example) blade assembly 212.

As will be explained below, monitoring process 10 may be configured to: define 450 a logical subcomponent group that includes a plurality of controlled subcomponents; associate 452 a subcomponent policy (e.g., 4+0, 3+1 or 2+2) with logical subcomponent group, and provide 454 one or more control signals (e.g., control signals 404, 406, 408, 410) that enable the assigning of the subcomponent policy (e.g., 4+0, 3+1 or 2+2) to the controlled subcomponent (in this example, blade assembly 212).

For example, monitoring process 10 may render a user interface (not shown) that allows an administrator (e.g., user 46) of storage system 12 to view and group the subcomponents of e.g., storage processor 100. For example and referring once again to FIG. 3, user 46 may define 450: a first group (i.e., logical subcomponent group 304) of controlled subcomponents, wherein logical subcomponent group 304 may include mission critical blade assemblies (e.g., blade assemblies 236, 238, 240, 242) that execute mission critical applications and provide mission critical services; a second group (i.e., logical subcomponent group 306) of controlled subcomponents, wherein logical subcomponent group 306 may include important blade assemblies (e.g., blade assemblies 224, 226, 228, 230, 232, 234) that execute important applications and provide important services; and a third group (i.e., logical subcomponent group 308) of controlled subcomponents, wherein logical subcomponent group 308 may include non-important blade assemblies (e.g., blade assemblies 212, 214, 216, 218, 220, 222) that execute non-important applications and provide non-important services.

Continuing with the above-stated example, monitoring process 10 (and user 46) may associate 452 a subcomponent policy of 2+2 with logical subcomponent group 304 (which includes blade assemblies 236, 238, 240, 242), as these blade assemblies execute mission critical applications and, therefore, should be operational as long as possible. And by assigning a subcomponent policy of 2+2 to logical subcomponent group 304, blade assemblies 236, 238, 240, 242 will remain operational until the failure of a third PSU. Accordingly, monitoring process 10 may provide 454 a binary zero for each of control signals 404, 406, 408, 410, wherein control signals 404, 406, 408, 410 are provided to (in this example) processing subsystems 292, 294, 296, 298.

Further, monitoring process 10 (and user 46) may associate 452 a subcomponent policy of 3+1 with logical subcomponent group 306 (which includes blade assemblies 224, 226, 228, 230, 232, 234), as these blade assemblies execute important applications and, therefore, should be operational for a longer period of time. And by assigning a subcomponent policy of 3+1 to logical subcomponent group 306, blade assemblies 224, 226, 228, 230, 232, 234 will remain operational until the failure of a second PSU. Accordingly, monitoring process 10 may provide 454 a binary zero for each of control signals 404, 408 and a binary one to each of control signals 406, 410, wherein control signals 404, 406, 408, 410 are provided to (in this example) processing subsystems 280, 282, 284, 286, 288, 290.

Additionally, monitoring process 10 (and user 46) may associate 452 a subcomponent policy of 4+0 with logical subcomponent group 308 (which includes blade assemblies 212, 214, 216, 218, 220, 222), as these blade assemblies execute non-important applications and, therefore, should be operational for a shorter period of time. And by assigning a subcomponent policy of 4+0 to logical subcomponent group 308, blade assemblies 212, 214, 216, 218, 220, 222 will remain operational until the failure of a first PSU. Accordingly, monitoring process 10 may provide 454 a binary one for each of control signals 404, 406, 408, 410, wherein control signals 404, 406, 408, 410 are provided to (in this example) processing subsystems 268, 270, 272, 274, 276, 278.

Additionally/alternatively, monitoring process 10 may be utilized to define a subcomponent policy for a single subcomponent within storage processor 100 and, therefore, may not require the logical grouping of subcomponents.

While monitoring process 10 is described above as residing on and being executed by storage system 12, this is for illustrative purposes only and is not intended to be a limitation of this disclosure, as other configurations are possible and are considered to be within the scope of this disclosure. For example, monitoring process 10 may reside on and may be executed by any type of system that includes both monitored subcomponents and controlled subcomponents.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 18).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A status monitoring system comprising:
 a signal generation subsystem configured to:
  provide a status signal indicative of the status of one or more monitored subcomponents, wherein the one or more monitored subcomponents include one or more power supply units and wherein the status signal includes a warning of an upcoming change in output of the one or more power supply units; and
 a processing subsystem associated with a controlled subcomponent, the processing sub systems configured to:
  assign a subcomponent policy to the controlled subcomponent, wherein assigning the subcomponent policy includes defining a policy signal associated with the subcomponent policy,
  receive the status signal,
  compare the status signal to the policy signal associated with the subcomponent policy, and
  effectuate a procedure on the controlled subcomponent based, at least in part, upon the comparison of the status signal and the policy signal associated with the subcomponent policy prior to the upcoming change in the output of the one or more power supply units.

2. The status monitoring system of claim 1 further comprising:
 two or more additional processing subsystems associated with two or more additional controlled subcomponents.

3. The status monitoring system of claim 1 further comprising:
 a communication bus configured to electrically couple the signal generation subsystem to the processing subsystem.

4. The status monitoring system of claim 1 wherein the status signal includes an upcoming failure indicator.

5. The status monitoring system of claim 1 wherein the status signal includes an overload indicator.

6. The status monitoring system of claim 1 wherein the controlled subcomponent includes a controlled subcomponent within a data storage system.

7. The status monitoring system of claim 1 further comprising:
 a computer program product residing on a non-transitory computer readable medium having a plurality of instructions stored thereon which, when executed by a processor, cause the processor to perform operations comprising:
  defining a logical subcomponent group that includes a plurality of controlled subcomponents,
  associating the subcomponent policy with logical subcomponent group, and
  providing one or more control signals that enable the assigning of the subcomponent policy to the controlled subcomponent.

8. The status monitoring system of claim 7 wherein the processing subsystem is configured to receive the one or more control signals.

9. The status monitoring system of claim 7 wherein the processing subsystem includes an analog-to-digital decoder circuit.

10. The status monitoring system of claim 9 wherein the analog-to-digital decoder circuit includes a comparator circuit configured to control the controlled subcomponent.

11. The status monitoring system of claim 9 wherein the analog-to-digital decoder circuit includes one or more voltage divider circuits configured to assign the subcomponent policy to the controlled subcomponent.

12. The status monitoring system of claim 11 wherein the one or more voltage divider circuits are configured to receive the one or more control signals.

13. A status monitoring system comprising:
 a signal generation subsystem configured to:
  provide a status signal indicative of the status of one or more monitored subcomponents, wherein the one or more monitored subcomponents include one or more power supply units and wherein the status signal includes a warning of an upcoming change in power of the one or more power supply units;
 a processing subsystem associated with a controlled subcomponent, the processing sub systems configured to:
  assign a subcomponent policy to the controlled subcomponent, wherein assigning the subcomponent policy includes defining a policy signal associated with the subcomponent policy,
  receive the status signal,
  compare the status signal to the policy signal associated with the subcomponent policy, and
  effectuate a procedure on the controlled subcomponent based, at least in part, upon the comparison of the status signal and the policy signal associated with the subcomponent policy;
 a communication bus configured to electrically couple the signal generation subsystem to the processing subsystem prior to the upcoming change in the output of the one or more power supply units; and
 a computer program product residing on a non-transitory computer readable medium having a plurality of instructions stored thereon which, when executed by a processor, cause the processor to perform operations comprising:
  defining a logical subcomponent group that includes a plurality of controlled subcomponents,
  associating the subcomponent policy with logical subcomponent group, and
  providing one or more control signals that enable the assigning of the subcomponent policy to the controlled subcomponent.

14. The status monitoring system of claim 13 wherein the processing subsystem is configured to receive the one or more control signals.

15. The status monitoring system of claim 13 wherein the processing subsystem includes an analog-to-digital decoder circuit.

16. The status monitoring system of claim 15 wherein the analog-to-digital decoder circuit includes a comparator circuit configured to control the controlled subcomponent.

17. The status monitoring system of claim 15 wherein the analog-to-digital decoder circuit includes one or more voltage divider circuits configured to assign the subcomponent policy to the controlled subcomponent.

18. The status monitoring system of claim 17 wherein the one or more voltage divider circuits are configured to receive the one or more control signals.

19. A status monitoring system comprising:
 a signal generation subsystem configured to:
  provide a status signal indicative of the status of one or more monitored subcomponents, wherein the one or more monitored subcomponents include one or more power supply units and wherein the status signal includes a warning of an upcoming change in output of the one or more power supply units;
 a processing subsystem associated with a controlled subcomponent, the processing sub systems configured to:

assign a subcomponent policy to the controlled subcomponent within a data storage system, wherein assigning the subcomponent policy includes defining a policy signal associated with the subcomponent policy, receive the status signal, compare the status signal to the policy signal associated with the subcomponent policy, and effectuate a procedure on the controlled subcomponent based, at least in part, upon the comparison of the status signal and the policy signal associated with the subcomponent policy;

a communication bus configured to electrically couple the signal generation subsystem to the processing subsystem prior to the upcoming change in the output of the one or more power supply units; and a computer program product residing on a non-transitory computer readable medium having a plurality of instructions stored thereon which, when executed by a processor, cause the processor to perform operations comprising:

defining a logical subcomponent group that includes a plurality of controlled subcomponents, associating the subcomponent policy with logical subcomponent group, and providing one or more control signals that enable the assigning of the subcomponent policy to the controlled subcomponent, wherein the processing subsystem is configured to receive the one or more control signals.

20. The status monitoring system of claim 19 further comprising:

two or more additional processing subsystems associated with two or more additional controlled subcomponents.

* * * * *